United States Patent [19]

Holzman

[11] Patent Number: 4,872,502

[45] Date of Patent: Oct. 10, 1989

[54] AIR COOLING OF ENCLOSED GEAR DRIVES

[75] Inventor: Richard W. Holzman, Waukesha, Wis.

[73] Assignee: The Falk Company, Milwaukee, Wis.

[21] Appl. No.: 100,895

[22] Filed: Sep. 25, 1987

[51] Int. Cl.[4] .................... F01M 5/00; F16H 57/02
[52] U.S. Cl. ................................... 165/39; 165/47; 165/119; 74/467; 74/606 A; 184/104.1; 184/6.22
[58] Field of Search ............. 74/606 A, 606 R, 467; 184/104.7, 104.2, 104.3, 6.12, 6.22; 165/47, 119, 39, 32; 123/41.12

[56] References Cited

U.S. PATENT DOCUMENTS

| | | | |
|---|---|---|---|
| 1,564,742 | 12/1925 | Acker | 184/104.1 |
| 2,391,186 | 12/1945 | Noble | 184/104.1 |
| 2,481,914 | 9/1949 | Eastman et al. | 74/606 A |
| 2,511,479 | 6/1950 | Olah | 184/104.1 |
| 2,548,805 | 4/1951 | Moir et al. | 184/104.1 |
| 4,074,590 | 2/1978 | Jorg | 74/606 A |
| 4,257,554 | 3/1981 | Willingham | 123/41.12 |

FOREIGN PATENT DOCUMENTS

| | | | |
|---|---|---|---|
| 519401 | 10/1953 | Belgium | 74/606 A |
| 858920 | 7/1949 | Fed. Rep. of Germany | 74/606 A |
| 515905 | 7/1976 | U.S.S.R. | 74/606 A |
| 436416 | 10/1935 | United Kingdom | 74/606 A |

OTHER PUBLICATIONS

Advertisement for Foote Bros. Hypower Worm Gear Drives Product Engineering Magazine—Sep. 1949 p. 73.

*Primary Examiner*—John Ford
*Attorney, Agent, or Firm*—Quarles & Brady

[57] ABSTRACT

A sheet metal enclosure surrounds all exposed sides of a floor mounted gear drive housing. An electric fan is mounted in an inlet duct at one end of the enclosure and an opposite end of the enclosure has an outlet duct which has an opening to the bottom. Cooling air is drawn into the enclosure through the fan and exits through the opening. The air encounters the normal protruberances and discontinuities in the surface of the gear housing and baffles mounted interior of the enclosure so that the air flow through the enclosure is turbulent. A part of the air flow is directed beneath the gear housing through a channel formed between spaced lateral feet of the housing.

12 Claims, 2 Drawing Sheets

AIR COOLING OF ENCLOSED GEAR DRIVES

BACKGROUND OF THE INVENTION

This invention relates to gear drives, and particularly to the air cooling of gear drives by use of an enclosure for the gear drive housing through which air is passed to cool the drive.

The mechanical rating of large enclosed gear drives of a given housing size has been increasing significantly because of stronger and harder gear materials, more accurate gear cutting and finishing methods, advanced bearing designs, and improved lubricants. Expressed in terms of mechanical load intensity, which is the mechanical rating per square foot of housing surface area, present gear drives have two to three times the load intensity of those of only two decades ago. This significantly greater load intensity has taxed the ability of the gear drives to transmit actual service horsepower equal to the mechanical rating without overheating. Overheating will manifest itself in unacceptably high temperatures in the lubricant sump in the base of the drive housing.

A number of different approaches have been proposed for cooling large enclosed gear drives. The approaches generally involve mechanical air cooling and water cooling.

In the simplest form, mechanical air cooling involves directing a fan against the exterior of the gear drive enclosure. Typically, one or more fans have been mounted on the shafts of the gear drive, usually on the input shaft because it operates at the highest speed. The addition of a shaft mounted fan or fans adds forced convection heat transfer and can increase the heat dissipation capacity significantly. However, the effectiveness of the shaft mounted fans depends on the fan diameter and input shaft speed. Shaft mounted fans often do not provide enough cooling since the size of the fan is limited by the physical size of the drive and the speed is limited to that of the application for the gear drive.

A separate electric fan can be positioned close to the gear drive housing and with or without a baffle to direct the air along the sides and top of the housing. One such arrangement is shown in U.S. Pat. No. 3,406,591 issued Oct. 22, 1968 to Homiller. This approach avoids the speed and size limitations of the shaft mounted fans but still provides insufficient cooling in many applications.

Sufficient air cooling has only been obtained heretofore with an external oil-to-air heat exchanger. A pump circulates the sump lubricating oil through a radiator that is cooled by an electric fan. This approach requires extensive piping and other external equipment.

Traditionally, water cooling has used an external oil-to-water heat exchanger with a pump to circulate the lubricating oil from the housing sump. For a large enclosed gear drive the flow rates of both the oil and water through the external cooler are very substantial, ranging up to 25 gallons per minute.

An alternative to such an external cooling method for the oil is the approach shown in U.S. Pat. No. 4,633,938 issued Jan. 6, 1987 to Schunck, et al., which employs internal, finned cooling tubes in the base of the drive housing.

Still another water cooling method involves cooling the air in the housing by use of an external heat exchanger and a pump for circulating the air from the housing through the exchanger and back to the housing. This later approach is shown in U.S. Pat. No. 3,736,812 issued June 5, 1973 to Wellauer.

Although water cooling may be the most effective, water may not be available in particular installations. Also, water cooling generally adds substantial piping and other external equipment to the gear drive installation.

SUMMARY OF THE INVENTION

In accordance with the invention an air cooling enclosure is provided that will surround a gear drive housing on all exposed sides except for shafts projecting from the housing. A source of air under pressure is admitted through an inlet of the enclosure and the air exits through an outlet at an opposite position in the enclosure. The air enclosure channels the moving, cooling air over the surfaces of the gear drive housing at a high speed. The normal surface protrusions and irregularities of the drive housing cause air turbulence which contributes to the heat transfer as the air moves through the enclosure. The air turbulence may be increased further by the addition of baffles on the inside of the enclosure.

The invention also resides in a method of air cooling a gear drive having a closed housing and shafts projecting from the housing, involving surrounding the exposed surfaces of the housing with an enclosure the sides of which are spaced from the housing surfaces and with openings for the shafts, and forcing air under pressure into one end of the enclosure, through the space between the housing and the enclosure, and out an opposite end of the enclosure.

With one common form of gear drive that is mounted on a floor or other foundation with side mounting feet and having a bottom raised above the feet, the enclosure also directs cooling air into and through the natural channel that is created between the bottom of the gear drive housing and the foundation.

The source of air under pressure may be an electric motor driven fan, compressed air with or without an air flow amplifier, or a central blower system for a series of gear drives or other equipment in a factory installation. In unusual environments such as high temperatures or excessive dirt, clean cool air may be ducted to the inlet to maintain high efficiency. An air filter may be inserted in the inlet to the enclosure.

Use of the air enclosure permits effective forced air cooling of a greater surface area of the gear drive enclosure at a higher efficiency through the use of a higher velocity with greater turbulence and less air dissipation. Large amounts of air may be forced through the air enclosure.

Because the air source is not mounted on a shaft of the gear drive, there is no loss of usable shaft length and the full shaft length is available for mounting couplings, sheaves, sprockets, backstops, and the like. Furthermore, there is no external overhung load on the shafts because the fan is not mounted on the shafts.

The foregoing advantages as well as other advantages and objects of the invention will be apparent from the following detailed description. In the description, reference is made to the accompanying drawings which illustrate a preferred embodiment of the invention.

DETAILED DESCRIPTION OF THE PREFERRED EMBODIMENT

Figure 1:
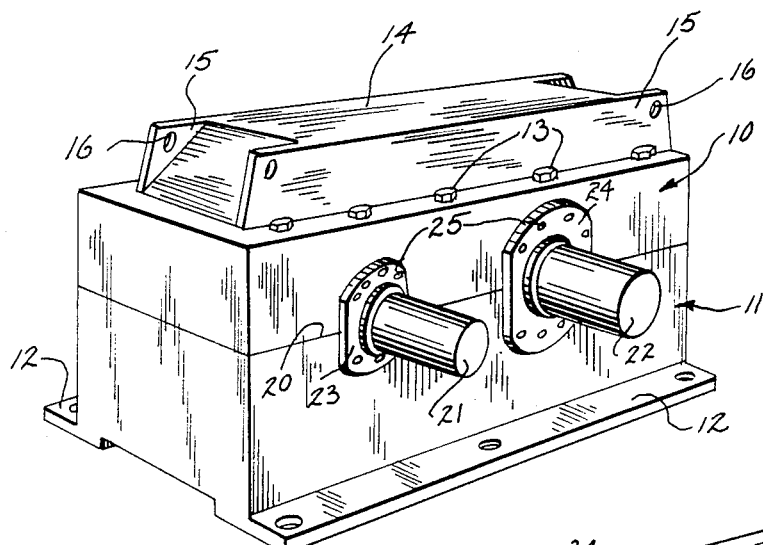
FIG. 1 is a view in perspective of a typical large size gear drive.

FIG. 1 illustrates a typical gear drive with which the present invention is useful. The gear drive has a closed housing formed of an upper cover section 10 and a lower base section 11. Each of the sections 10 and 11 are of fabricated steel plate construction with both sides and end panels that are welded together. The base 11 includes a pair of lateral mounting feet 12 which extend from the lateral sides of the base 11. The feet 12 have a gap between them so that the bottom of the base 11 is raised off of the foundation upon which the gear drive is supported. The cover 10 is joined to the base 11 by a series of mounting bolts 13 which extend through the cover 10 and are received in threaded openings in the base 11. The cover 10 also includes an arched cover portion 14 inboard of the mounting bolts 13 and which has extending sides 15 with opening 16 for receiving hooks for lifting the gear drive.

The shafts and gearing in the gear drive are typically located along the parting line 20 between the cover 10 and base 11, respectively. In the drive illustrated, two shafts are shown, an input shaft 21 and an output shaft 22. Bearing retaining hubs 23 and 24 surround the shafts 21 and 22, respectively, and are attached by bolts 25 to the cover 10 and base 11 to close the shaft openings in the drive housing.

An air cooling enclosure in accordance with the invention has a sheet metal sides which totally surround all of the exposed sides of the gear drive housing. In the floor mounted gear drive of the type illustrated in FIG. 1, the enclosure envelopes all sides save for the bottom of the gear drive housing, which is mounted to a foundation and is not exposed. The enclosure does surround one end of the central gap formed between the feet 12.

Specifically, a main enclosure member indicated generally by the numeral 30 includes upright walls 31, a flat roof 32, and inclined sloping portions 33 which connect the roof 32 to the walls 31. The walls 31, roof 32, and inclined portions 33 can be formed by suitably bending a single sheet of sheet metal. Joined internally to the main member 30 are sloping fore and aft members 34 and 35, respectively, which span the distance between the inclined portions 33 and walls 31.

Figure 2:
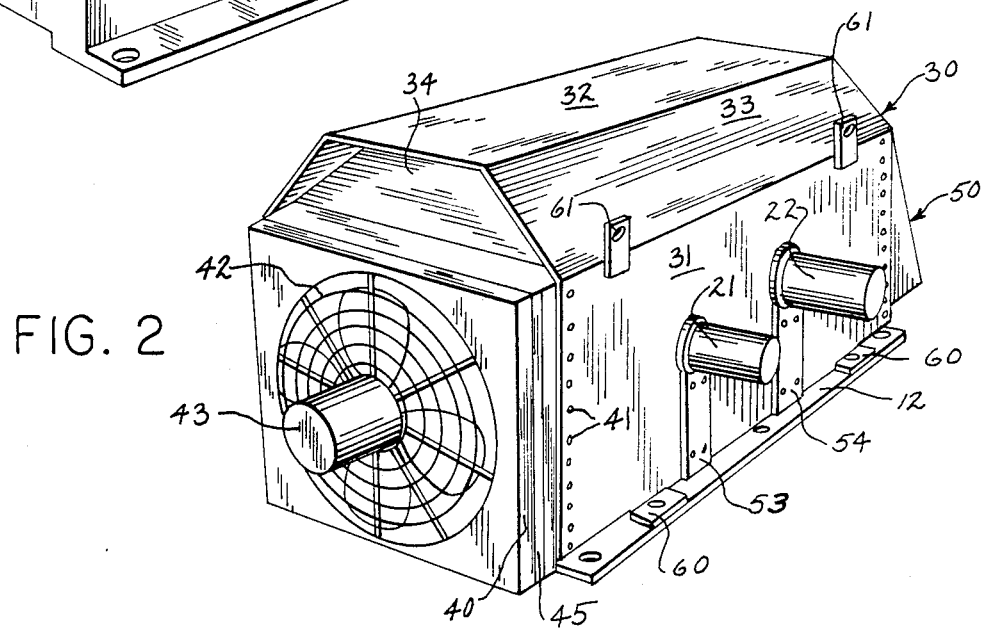
FIG. 2 is a view in perspective of such a gear drive with an air cooling enclosure in accordance with the present invention surrounding the gear drive.

An inlet duct 40 is attached to one open end of the main member 30 by screws 41. The inlet duct 40 includes an intake screen 42 which mounts an electric motor 43 connected to a fan 44. An air filter 45 is disposed within the inlet duct 40 between the fan 44 and the interior of the main member 30. The filter 45 may be installed and removed by sliding into place from a side of the duct 40, as seen in FIG. 2. The bottom wall 46 of the inlet duct 40 slopes downwardly to the bottom of the feet 12 so that the inlet duct 40 communicates with the gap between the feet 12.

The opposite open end of the main member 30 mounts a wedge-shaped exit shroud 50 having a downwardly sloping portion 51 and side walls 52. The shroud 50 is open at its bottom.

The walls 31 of the main member 30 are provided with suitable cut-outs to accommodate the shafts 21 and 22. Cover plates 53 and 54 close the cut-outs after the main member 30 is installed upon the gear drive.

Figure 3:
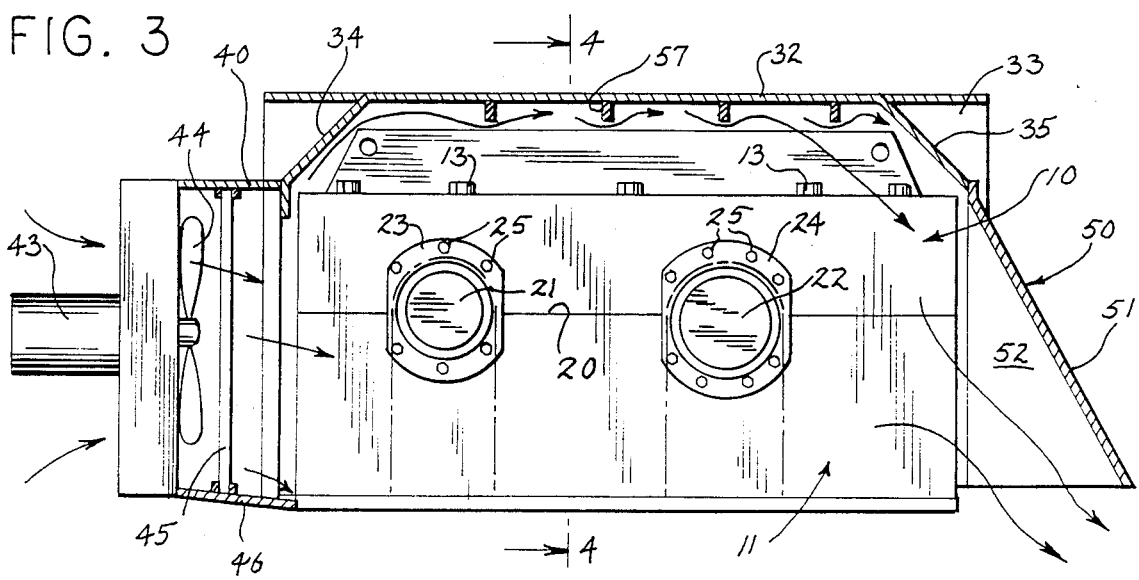
FIG. 3 is a view in vertical section of the air box with the enclosed gear drive shown in side elevation.
Figure 4:
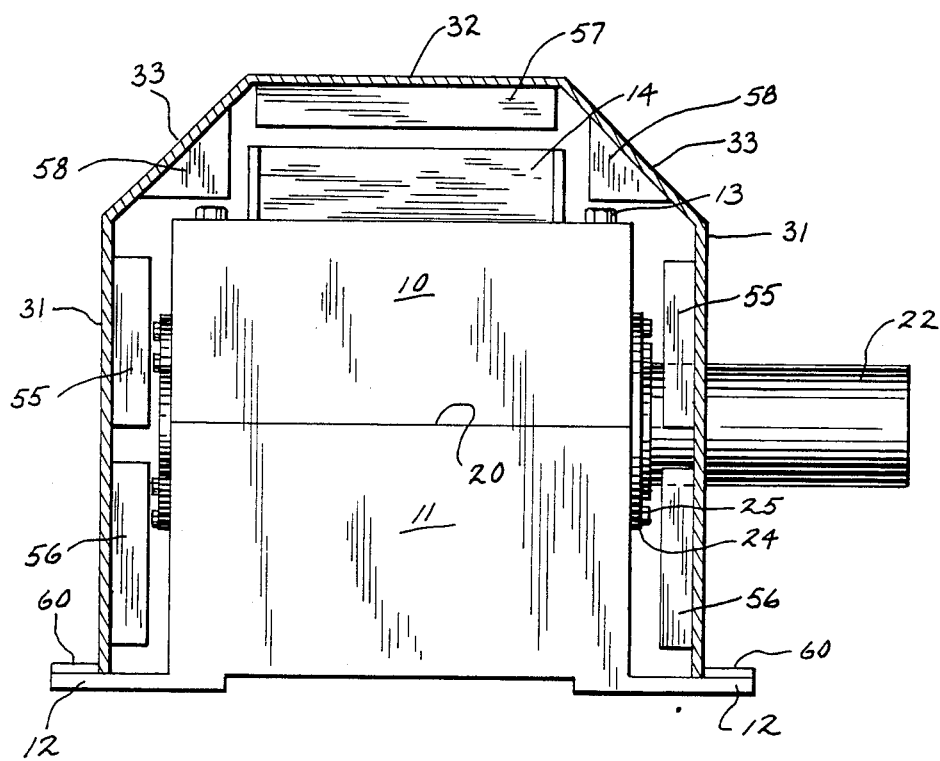
FIG. 4 is a view in vertical section taken in the plane of the line 4—4 of FIG. 3.

As shown in FIGS. 3 and 4, a series of spaced baffles extend inwardly from the sides of the enclosure towards the surfaces of the gear drive housing. Specifically, there are upper and lower side baffles 55 and 56, respectively, transverse top baffles 57, and corner baffles 58. The baffles terminate short of the surfaces of the gear drive housing so that there are spaces between the baffles and the housing as well as between adjacent baffles.

The enclosure is completed by feet 60 extending from the bottom of the walls 31 and which rest upon the mounting feet 12 of the gear drive. Lifting tabs 61 extend upwardly from the walls 31.

As shown in FIG. 3, the enclosure is spaced from the outer profile of the gear drive housing. Air is drawn into the enclosure by the fan 44 through the screen 42 and filter 45 and is circulated around the entire exterior of the drive housing, including through the natural channel formed by the gap between the feet 12, until it exits through the open bottom of the exit shroud 50. Circulating the air around and under the housing base 11 provides maximum cooling efficiency. The base 11 contains the lubricating oil sump and has the highest heat transfer rate to the outside of the gear drive. As hot oil is splashed onto the inside of the cover 10 by the gearing during operation, the heat transfer of the cover 10 approaches that of the base 11. Thus, the enclosure insures that all of the efficient heat transfer surfaces of the housing will be exposed directly to the cooling air.

The natural irregular surfaces of a gear drive housing assist in the air cooling. As the air moves through the enclosure and over the surfaces of the drive housing, it will encounter protrusions and surface discontinuities which are normal to such housings. This will result in turbulence in the air flow and will improve the cooling effect. The baffles 55, 56, 57 and 58 significantly increase the air turbulence within the enclosure. The exit for the air is lateral to the direction of air movement through the enclosure so that the air is forced to change direction thereby contributing further to turbulence.

All of the air that is drawn into the enclosure by the fan, except for very minor leakage, will pass over the surface of the gear drive housing. Because the speed of the fan can be faster than might be possible using one of the shafts of the gear drive, a higher velocity of air flow is possible thereby also contributing to the cooling effect. Large quantities of air can be forced into the enclosure. The space between the interior of the enclosure and the exterior of the gear drive housing can be sized for maximum efficiency of cooling. A narrow space will increase the velocity of air movement through the enclosure.

Although the preferred embodiment uses an electric fan as the source of air, other sources of air can be used. For example, compressed air from a central source or by a source specific for the gear drive could be introduced into the inlet of the enclosure thereby replacing the fan. The compressed air may also be used with an air flow amplifier. A central blower system can be connected to the inlet of the enclosure. The source of the air will typically be dictated by the conditions of the environment, the location of the site at which the gear drive is to be used, the economics, and the overall cooling requirements.

Contaminants in the ambient air can be prevented from settling on the housing by use of the filter 45. Where the ambient air is unusually hot or high in dirt content, clean cool air from outside the environment may be ducted to the inlet of the enclosure.

The outlet air may be constrained and further ducted to another location to cool additional equipment such as another gear drive or an electric motor. The direction of the exit air may also be changed to accommodate requirements for the direction of air flow, such as to avoid the location of a nearby worker.

Figure 5:
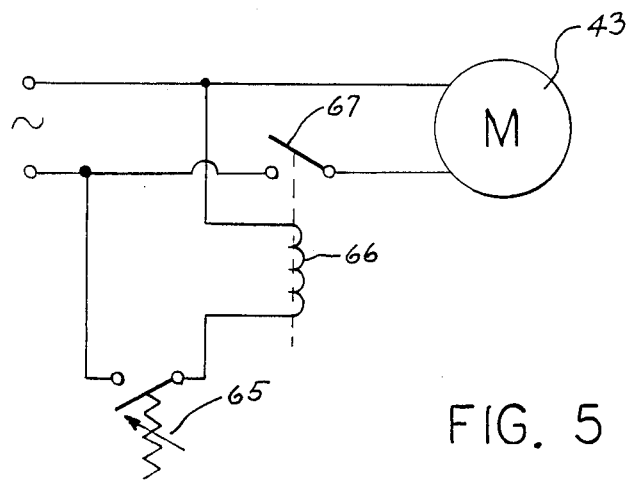
FIG. 5 is a schematic view of a thermostatic control for electric motor for the fan.

The fan or other air source may be thermostatically controlled based on the temperature of the lubricating oil in the sump. Such an arrangement is shown schematically in FIG. 5 in which an adjustable temperature sensor switch 65, submerged in the lubricant oil sump of the gear drive housing, controls a relay 66 whose contact 67 is connected between the fan motor 43 and a source of electricity. When cooling air is not required, as determined by the sump temperature, the fan can be turned off automatically.

What is claimed is:

1. An air cooling enclosure for a gear drive having a closed housing and shafts projecting from the housing, comprising:
    a plurality of sides joined together to surround all exposed surfaces of the gear drive housing except for a bottom of the housing, said sides being spaced from the surfaces of the housing and having openings through which the shafts project, one of the sides having an air inlet and an opposite side having an air outlet;
    a plurality of spaced baffles extending inwardly from the sides of the enclosure toward the housing; and
    a source of air under pressure connected to the air inlet.

2. An enclosure in accordance with claim 1 wherein the source of air is a fan mounted in a duct connected at the air inlet and driven by an electric motor.

3. An enclosure in accordance with claim 2 wherein an air filter is removably mounted in the duct.

4. An enclosure in accordance with claim 2 together with means for controlling the operation of the electric motor in accordance with the temperature of the gear drive.

5. An enclosure in accordance with claim 1 wherein the air outlet is connected to an exit shroud with a discharge opening, the shroud directing air laterally away from the enclosure.

6. An enclosure in accordance with claim 1 wherein the sides are formed of sheet metal.

7. An air cooling enclosure for a gear drive having a closed housing and shafts projecting from the housing, the enclosure comprising:
    a plurality of sheet metal sides joined together to surround all exposed surfaces of the gear drive housing except for a bottom of the housing and being closely spaced from the surfaces of the housing, said sides having openings through which the shafts project but otherwise totally enclosing the gear drive save for said bottom, the sides defining an air inlet and an opposite air outlet;
    a plurality of spaced baffles extending inwardly from the sides of the enclosure toward the housing; and
    a source of air under pressure connected to the air inlet.

8. An enclosure in accordance with claim 7 wherein the source of air is a fan mounted in a duct connected at the air inlet and driven by an electric motor.

9. An enclosure in accordance with claim 8 wherein an air filter is removably mounted in the duct.

10. An air cooling enclosure for a gear drive having a box-like closed housing with an arched roof and with surface discontinuities and protrusions and with shafts projecting from the housing, the enclosure comprising:
    a plurality of sheet metal sides joined together to surround all exposed surfaces of the gear drive housing except for a bottom of the housing, said sides being closely spaced from the surfaces of the housing, the sides including
    a main member having lateral upright walls, a roof, inclined portions joining the roof to the walls, and fore and aft sloping end portions spanning the interior space between the roof and the inclined portions on either side of the roof, the walls having openings through which the shafts project,
    an inlet duct connected to the walls and to the fore end portion, and
    an outlet shroud connected to the walls and to the aft end portion;
    a plurality of spaced baffles extending inwardly from the walls, roof and inclined portions of the main member; and
    a source of air under pressure connected to the inlet duct.

11. An enclosure in accordance with claim 10 wherein the source of air is a fan mounted in the duct and driven by an electric motor mounted to the duct, together with a removable filter mounted in the duct.

12. An enclosure in accordance with claim 10 wherein the outlet shroud is wedge shaped and has an outlet opening that is lateral to the longitudinal axis of air flow through the enclosure.

* * * * *